Sept. 13, 1927.  J. WULF  1,642,527

CLUTCH

Filed Nov. 1, 1926

Inventor
John Wulf
by Hazard and Miller
Attorneys

Patented Sept. 13, 1927.

1,642,527

UNITED STATES PATENT OFFICE.

JOHN WULF, OF LOS ANGELES, CALIFORNIA.

CLUTCH.

Application filed November 1, 1926. Serial No. 145,534.

My invention is a clutch for line shafting to form a clutch connection between the ends of two adjoining rotating shafts. The clutch is of the rigid type and is not intended to accommodate a flexibility of the shafts or misalignment thereof.

An object of my invention is a line shaft clutch for forcing the grip of the clutch on a shaft end without any distorting forces or stresses tending to displace the alignment of the shafts. Stated positively, an object of my invention is a line shaft clutch to hold the shafts in accurate alignment when the clutch is being applied to one of the shafts to grip same and holding such shafts in alignment after a full grip has been effected.

A more specific object of my invention is in a clutch having a split sleeve and pressing one part of the sleeve positively against the shaft before the other part of the split sleeve is given a movement to grip the shaft, thereby preventing a mis-alignment of the shafts, the housing and gripping elements being mounted on the shaft opposite to the one having the sleeve thereon.

In constructing my invention I utilize certain standard features in which one of the shafts has a sliding cone actuated by the usual clutch lever and also has a fixed collar on the end of such shaft, the clutch housing being rigidly connected to the collar, the split sleeve fitting loosely on the end of the adjoining shaft, being held in place by a clamping collar. A plurality of levers pivotally connected to the housing bear on the sliding cone, the other ends of the levers being arranged to act on the split sleeve. One of these thrusts the sleeve radially against the shaft, another thrusts the center part of the split sleeve into close contact with the shaft and the third lever gives the split part of the sleeve a twisting motion to cause the sleeve to grip the shaft and thus transmit motion from one shaft to the other.

My invention will be more readily understood from the following description and drawings, in which Figure 1 is a side elevation of my clutch showing adjacent parts of the line shafting.

Figure 4:
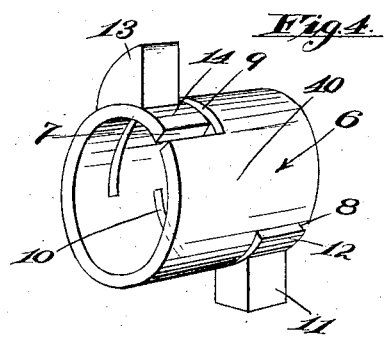
Figure 4 is a perspective view of the split sleeve.

In the drawings, the power shaft 1 is to drive the driven shaft 2 by means of a clutch arrangement secured to the ends 3 and 4 respectively of such shafts. A clamping collar 5 is secured on the power shaft spaced from the end and a split sleeve 6 is fitted on the end of such power shaft; such sleeve is illustrated particularly in Figure 4, and has a plurality of partial longitudinal slits 7 and 8 and partial circumferential slits 9 and 10. A square lug 11 is secured to the flexible end 12 and a cam lug 13 is secured to the other flexible end 14.

A clutch collar 15 is rigidly secured on the end 4 of the shaft 2 by any suitable means and has a radial flange 16 extending outwardly from the collar. A housing 17 extends parallel to the shafts enclosing the split sleeve 6. This housing is illustrated particularly in Figure 2, having diametrically opposite curved portions 18 and 19, extensions 20 and 21, and opposite ends 22 and 23.

A cam lever 24 is mounted on a pivot pin 25; this pin extending between the two sides of the extension 20 and having a cam end 26 inside the housing. The free end 27 extends through an opening 28 in the flange 16.

A holding lever 29 is mounted on a pivot pin 30 fitting between ears 31 extending outwardly from the end 23 of the housing and has an adjusting screw 32 extending through the end over the housing, this screw being connected to a block 33 slidable in an opening 34 in the end 23 of the housing, this block bearing against the square lug 11 on the split sleeve. It will be noted that the block 33 is enlarged on the inside of the housing to prevent same from moving outwardly too far. The free end 35 of the lever 29 extends along the shaft 2 to a greater extent than the end 27 of the lever 24. A pressing lever 36 is pivotally mounted on a pair of ears 37 extending outwardly from the curved side 19 of the housing and has an adjusting screw 38 extending there-through, this screw passing through an aperture 39 in the housing and the end bearing against substantially the center portion of the sleeve, as indicated by the numeral 40.

The clutch is operated in the usual manner by having a sliding cone 41 loosely fitted on the shaft 2, there being a collar or the like 42 operated by a clutch lever 43, this being to slide the cone one way or the other in order to press the free ends of the various levers or the like or allow them to move towards each other due to the resilient action of the split sleeve. It will be noted that the free end 44 of the pressing lever 36 meets the cone at substantially the same time as the free end 27 of the cam lever 24 but that the free end 35 of the holding lever 29 engages the cone before either of the other two levers.

Figure 1:
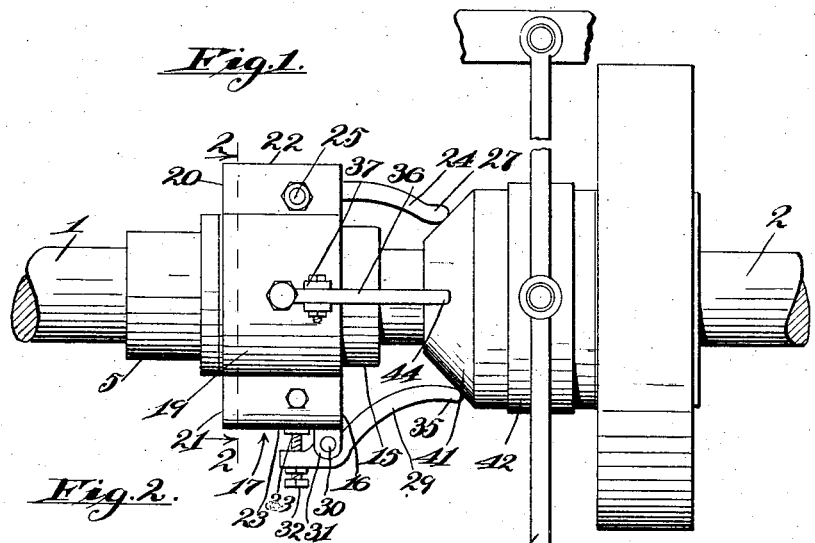
Figure 2:
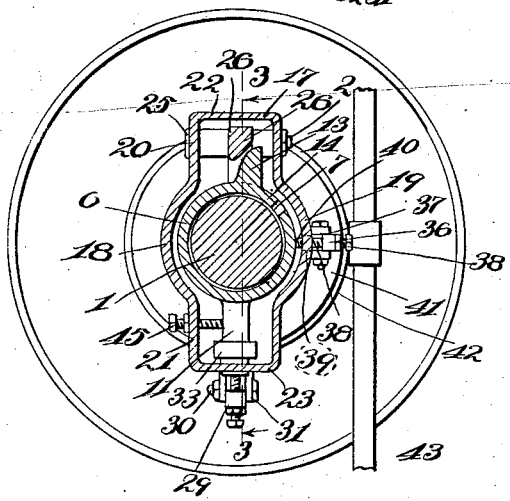
Figure 2 is a transverse vertical section on the line 2—2 of Figure 1 in the direction of the arrows.
Figure 3:
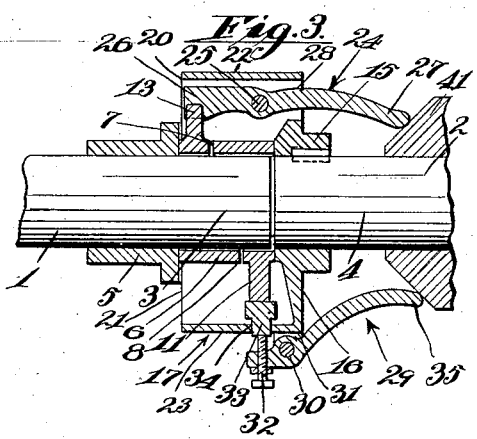
Figure 3 is a longitudinal section on the line 3—3 of Figure 2 in the direction of the arrows.

The manner of operation of my clutch is substantially as follows: when the cone is moved lengthwise of the shaft 2 towards the clutch collar 15, the holding lever 29 is first actuated and the pressure of the block 33 on the square lug 11 forces the free end 12 of the split sleeve 6 into close engagement with the end 3 of the power shaft 1. On further movement this pressure is increased and the clutch lever 24 and the pressing lever 36 are brought into action. The pressing lever 36, as above mentioned, presses the adjusting screw 38 against the center or solid portion of the split sleeve and the cam lever 24 forces the cam end 26 into close engagement with the cam lug 13 thereby squeezing the free end 14 of the split sleeve into close engagement with the power shaft. As the action of the cone gradually displaces the levers and gradually clamps the split sleeve, the rotary motion is transmitted from the power shaft to the driven shaft in a gradual manner without a jerky motion and gives an effective drive, the split sleeve being pressed at three points against the end of the power shaft. As an extra precaution to prevent turning of the sleeve, a set screw 45 extends through one wall of the extension 21 of the housing engaging the square lug 11, as indicated in Figure 2.

From the above description, it will be seen that the free or split ends of the split sleeve are pressed into close engagement with the shaft on opposite sides of such shaft and therefore there is no tendency to displace one shaft relative to the other as is the case when only the cam lever is used. The free lever pressing on the solid part of the split sleeve holds same in a firm relation to the shaft and to the other levers. The release of the clutch is obvious as when the cone is moved so that the free ends of the levers can swing inwardly towards the shaft 2, the resilient nature of the free ends of the split sleeve free same from the shaft and slightly shift the levers for operating such ends. The pressing lever 36 adjusts itself slightly on the release of the pressure on its free end.

Various changes may be made in the principles of my invention without departing from the spirit thereof, as set forth in the description, drawings and claims.

I claim:

1. A clutch for aligned shafts comprising in combination, a collar having a housing, a pair of levers pivotally connected to opposite sides of said housing, a split sleeve having a pair of partial longitudinal slits and a pair of partial circumferential slits leaving free resilient ends, a lug connected to one end and a cam lug connected to the other end, a cam on the end of one lever to engage the cam lug, a block connected to one end of the other lever engaging the said lug, and means to operate said levers.

2. As claimed in claim 1: a free lever pivotally connected to the housing, means engaging said lever and the solid part of the sleeve, said lever being operated when the other levers are operated.

3. A clutch for aligned shafts comprising in combination, a collar having a housing, a cam lever pivotally connected to the housing, a split sleeve having a cam lug on a resilient part to engage the cam lever, a holding lever pivotally connected to the housing substantially directly opposite to the cam lever, means operatively connecting said lever to a resilient part of the sleeve, a pressure lever pivotally connected to the side of the housing, means engaging said lever and a rigid part of the sleeve, and means to actuate said levers.

4. A clutch for aligned shafts comprising in combination a clutch collar having a housing, a plurality of levers pivotally connected to the housing, a sleeve split so as to form a solid portion and two resilient portions, a compression lug connected to one of said resilient portions and a cam lug connected to the other resilient portion of the sleeve, means associated with one of said levers for depressing said compression lug and causing one of said resilient portions to engage one of said shafts, cam means on the other of said levers engaging said cam lug causing the other of said resilient portions to engage said shaft and means for actuating said levers.

5. A clutch for aligned shafts comprising in combination a clutch collar having a housing, a plurality of levers pivotally connected to the housing, a sleeve split so as to form a solid portion and two resilient portions, a compression lug connected to one of said resilient portions and a cam lug connected to the other resilient portion of the sleeve, means associated with one of the levers for depressing said compression lug to depress one of said resilient portions to engage one of the shafts, and cam means on the other of said levers permitting said resilient portion to be forced against said shaft, and means for actuating said levers.

6. A clutch for aligned shafts comprising in combination a clutch collar having a housing, a plurality of levers pivotally connected to the housing, a sleeve split so as to form a solid portion and two resilient portions at either end of the same, a compression lug connected to one of said resilient portions and a cam lug connected to the other resilient portion of said sleeve, means associated with one of said levers for depressing said compression lug and causing one of said resilient portions to engage one of said shafts, cam means on the other of said levers, permitting said cam lug to depress the other resilient portion of said sleeve to engage said shaft, the lever operating said compression lug being longer than the lever operating said cam lug, and a sliding cone on the other of said shafts adapted to engage the ends of said levers to operate the same, whereby said first mentioned lever will be operated first.

7. A clutch for aligned shafts comprising in combination a clutch collar having a housing, a plurality of levers pivotally connected to the housing, a sleeve split so as to form a solid portion and two resilient portions, a compression lug connected to one of said resilient portions and a cam lug connected to the other resilient portion of the sleeve, means associated with one of the levers for depressing said compression lug and causing one of said resilient portions to engage one of the shafts, a beveled surface on the other of said levers adapted to engage said cam lug and cause the same to depress said other resilient portion to engage said shaft, and a single means for actuating said levers, said lever which operates said compression lug being adapted to be operated first.

In testimony whereof I have signed my name to this specification.

JOHN WULF.